United States Patent [19]

Morito

[11] Patent Number: 4,691,359

[45] Date of Patent: Sep. 1, 1987

[54] SPEECH SYNTHESIZER WITH REPEATED SYMMETRIC SEGMENT

[75] Inventor: Makoto Morito, Tokyo, Japan

[73] Assignee: OKI Electric Industry Co., Ltd., Tokyo, Japan

[21] Appl. No.: 558,205

[22] Filed: Dec. 5, 1983

[30] Foreign Application Priority Data

Dec. 8, 1982 [JP] Japan .............................. 57-213971

[51] Int. Cl.⁴ .............................................. G06F 9/00

[52] U.S. Cl. .................................................... 381/51

[58] Field of Search .................................... 381/51-53

[56] References Cited

U.S. PATENT DOCUMENTS 4,214,125 7/1980 Mozer et al. ......................... 381/51

4,398,059 8/1983 Lin et al. .............................. 381/51

4,577,343 3/1986 Oura ..................................... 381/51

*Primary Examiner*—Gareth D. Shaw

*Assistant Examiner*—John G. Mills

*Attorney, Agent, or Firm*—Martin M. Novack

[57] ABSTRACT

A speech synthesizer for reproducing natural speech with small memory. Synthesized speech consists of symmetric speech segments. Only half of a symmetric speech segment is stored in a memory through ADPCM code, and the other half of the segment is generated by using the stored half segment. Repeat control data is also stored in a memory so that only a single segment is enough to be stored when the same segments are repeated. In the repeated process, the amplitude of the segment is changed smoothly so that amplitude discontinuity between the two successive segments does not occur. The synthesized digital speech data is converted to an analog waveform by using a digital to analog converter.

3 Claims, 23 Drawing Figures

SPEECH SYNTHESIZER WITH REPEATED SYMMETRIC SEGMENT

BACKGROUND OF THE INVENTION

The present invention relates to an apparatus for speech synthesizing, in particular, relates to such an apparatus which provides excellent synthesized speech using a simple circuit and small capacity of memory.

ADPCM (Adaptive Differential Pulse Code Modulation) has been a known band compression technique for voice channel. The ADPCM system compresses the voice frequency signal by taking the difference between the actual signal level at time $T_2$ and the predicted signal level calculated by the signal level at time $T_1$. In the demodulation stage, the difference is sequentially accumulated to provide a voice signal in PCM form. The quantization step for the quantization of a voice signal depends upon an instantaneous voice signal level.

FIG. 1 shows a block diagram of a prior ADPCM reproducer, which reproduces an ADPCM signal to provide a voice signal. In FIG. 1, the reference numeral 1 is an input terminal, 2 is an adder, 3 is a multiplicator, 4 is an adder, 5 is a register, 6 is a table for converting ADPCM code $L_n$ to the quantization step size moving coefficient $M_n$, 7 is a multiplicator, 8 is an amplitude limiter, 9 is a register, 10 is an output terminal of demodulated PCM signal and that output terminal 10 is coupled with a D-A converter (not shown) for converting digital voice signal to analog voice signal.

It is assumed that the ADPCM signal at the input terminal 1 is $L_n$. The bias value 0.5 is added to the signal $L_n$ by the adder 2. The sum from the adder 2 is applied to the multiplicator 3 which provides the product of said sum and the output $\Delta_n$ of the register 9. The output $\Delta_n$ is called a quantization step size. The output $q_n$ of the multiplicator 3 is the differential reproduced value of the ADPCM code $L_n$, and is expressed as follows.

$$q_n = \Delta_n(L_n + \tfrac{1}{2}) \quad (1)$$

The differential reproduced value $q_n$ from the multiplicator 3 is added to the output $\hat{x}_n$ of the register 5 in the adder 4, and the result $\hat{x}_{n+1}$ is stored in the register 5. Those results $\hat{x}_n$ and $\hat{x}_{n+1}$ are reproduced PCM signals of a voice signal.

When ADPCM code has 3 bits, and reproduced PCM code has 12 bits, the compression ratio by using ADPCM code is $3/12 = \frac{1}{4}$.

Another system for the compression of a voice signal is the use of even symmetry of a voice signal. When the voice signal is even symmetrical with the samples $2N-1$ as shown in FIG. 2, the following relations are satisfied, where f(T) is the amplitude of a voice signal.

$f(T) = f((2N-1)T)$ $f(2T) = f((2N-2)T)$ $f((N-1)T) = f((N+1)T)$

Therefore, it is possible to reproduce $2N-1$ signals by using only N samples, and it should be noted that the information quantity of voice signal is even halved by using the even symmetrical nature of a voice signal. Accordingly, it has been desired to develop an ADPCM circuit to handle an even symmetrical voice signal.

Another system for the compression of a voice signal is the use of repetition of the similar waveforms. It has been known that the change of the transfer function of a vocal tract is very slow, and is constant during 30 msec, although it depends upon each person. In a vowel sound, the same waveforms are repeated in every pitch at least three times. Therefore, when the synthesized voice is repeated by three times, the voice is compressed to one-third.

However, a prior repetition compression system has the disadvantage that the level of the voice signal is constant during the repetition. FIG. 3 shows the explanation, in which FIG. 3(*a*) shows the waveform of the actual pronounciation, in which p shows the length of a pitch. FIG. 3(*b*) is the synthesized waveform by a prior art system, in which the pitches $p_1$, $p_2$ and $p_3$ have the same level as one another, and the pitches $p_4$, $p_5$ and $p_6$ have also the same level as one another. Accordingly, the change of the average power of the voice signal is stepwise as shown by the curve (b) of FIG. 3(*c*), although the average voice power of the actual speech changes smoothly as shown in the curve (a) of FIG. 3(*c*). The difference between the curves (a) and (b) of FIG. 3(*c*) causes the deterioration of the quality of the synthesized speech.

Accordingly, an improved speech synthesizer system which provides excellent quality speech with simple circuitry and small information quantity has been desired.

SUMMARY OF THE INVENTION

It is an object, therefore, of the present invention to overcome the disadvantages and limitations of prior speech synthesizers by providing a new and improved speech synthesizer.

It is also an object of the present invention to provide a speech synthesizer which provides high quality of speech with less memory quantity.

It is also an object of the present invention to provide a speech synthesizer which uses (1) ADPCM technique for reducing memory capacity, (2) symmetrical nature of speech waveforms so that only half of waveforms are enough to store in a memory, (3) repetition of a speech segment so that only one cycle of information of the segment is enough to store in a memory, and (4) the adjustment of amplitude of each repetition in order to provide excellent synthesized speech quality. The adjustment of the amplitude is accomplished without using a multiplicator, which would complicate a circuit structure.

The above and other objects are attained by a speech synthesizer for reproducing speech segments in a memory which stores at least half of symmetrical ADPCM data of speech waveforms, repetition times for repeating the same waveforms, the pointer increment/decrement value for determining strength of speech in each repetition, and then initial data of symmetrical waveforms, comprising; (a) a first memory (170) storing a predetermined plurality of quantization step size, (b) a pointer (165) for designating address of said first memory (170) for taking quantization step size according to pointer increment/decrement value and repetition times, (c) a second memory (163) for updating output of said pointer according to ADPCM data in said memory, (d) means (169–174) for reproducing PCM data by ADPCM data, (e) a register (173) for storing reproduced PCM data, (f) means (158,159,160) which provides initially zero and then accumulated increment-/decrement value of amplitude in each repetition cycle, (g) an adder (167) for designating address of said first memory (170) by sum of output of said means (158, 159,

160) and output of said pointer (165), (h) means (161,168) for providing sum of initial data of symmetrical waveforms in said memory and output of said accumulated increment/decrement value to provide initial address of said first memory (170), and (i) a digital-analog converter (177) for converting synthesized digital speech in said register (173) to an analog form to provide an output speech signal.

BRIEF DESCRIPTION OF THE DRAWINGS

The foregoing and other objects, features, and attendant advantages of the present invention will be appreciated as the same become better understood by means of the following description and accompanying drawings wherein;

FIG. 3(*b*) shows waveforms of a prior synthesized speech,

FIG. 3(*c*) shows curves of an average power of the waveforms of FIG. 3(*a*) and FIG. 3(*b*), FIG. 4 which is made up of FIGS. 4A–4E, arranged as shown in the diagram next to FIG. 4A, is a block diagram of the speech synthesizer according to the present invention, FIGS. 5(*a*), 5(*b*) and 5(*c*) show the data format for the speech synthesizer according to the present invention.

DESCRIPTION OF THE PREFERRED EMBODIMENT

Figure 3:
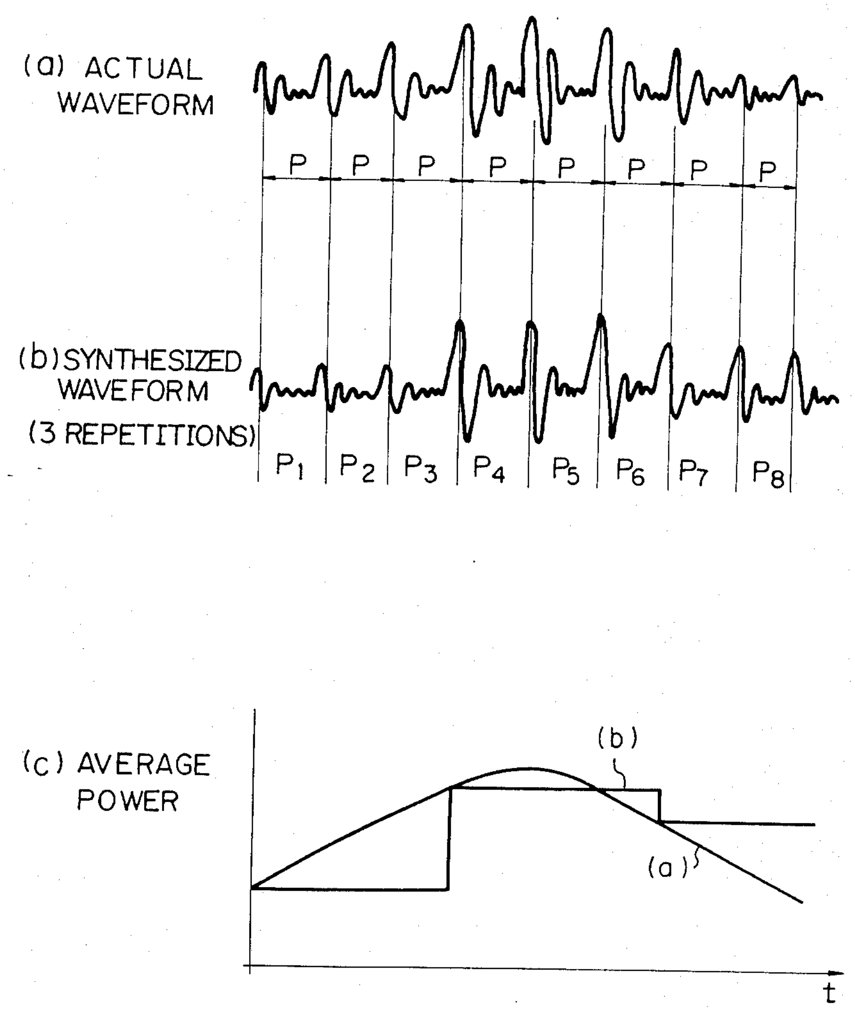
FIG. 3(*a*) shows waveforms of actual speech.

The present voice synthesizer has three features, (1) the use of ADPCM, (2) the use of even symmetrical waveform, and (3) the amplitude of the repetition waveforms is adapted so that the average power of the synthesized signal coincides substantially with the curve (a) of FIG. 3(*c*). In particular, said feature (3) is carried out without using a multiplicator which would take a long time and is complicated.

Figure 5:
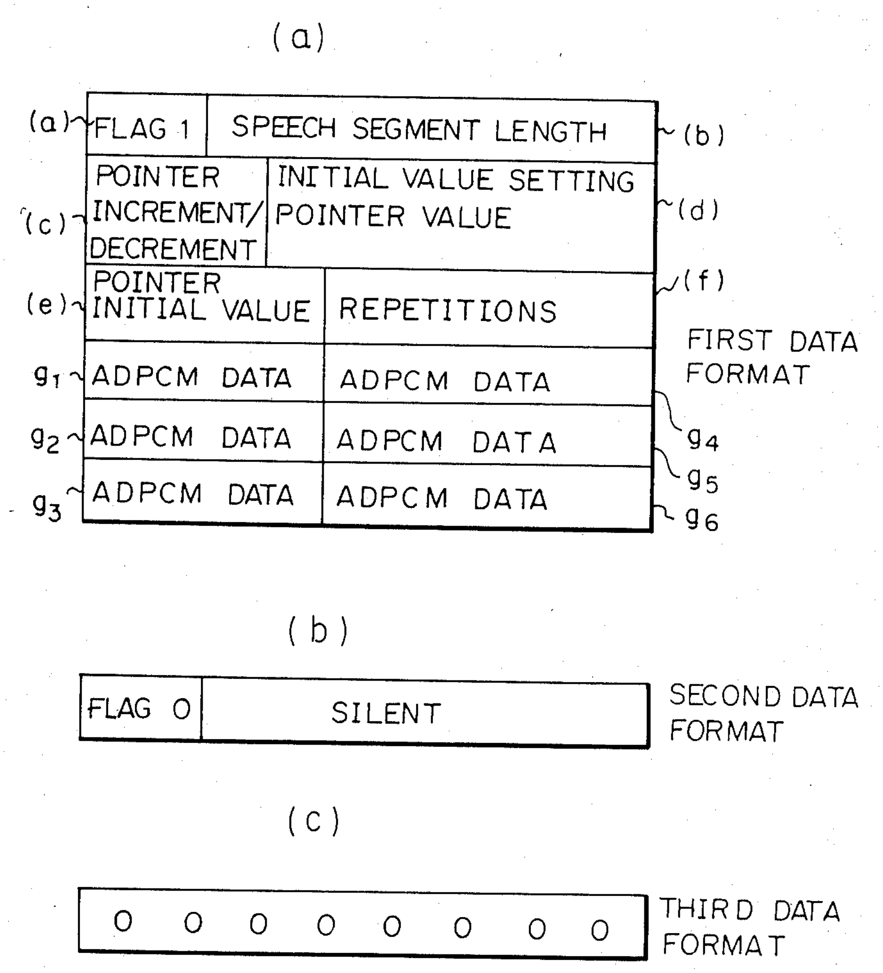

FIG. 5 shows the data format for use in the present apparatus. There are three data formats which are applied to the input terminal of the present apparatus.

Figure 6:
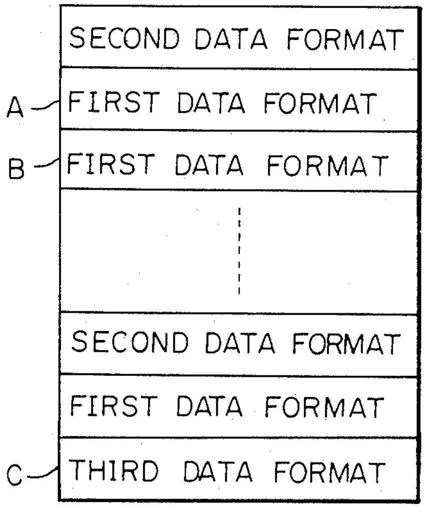
FIG. 6 shows the configuration of the speech data according to the present invention, FIG. 7, which is made up of FIGS. 7A and 7B, placed side-by-side, shows the time sequence of the operation of the apparatus of FIG. 4.

The first data format shown in FIG. 5(*a*) provides a symmetrical waveform repetitively. The repeated symmetrical waveforms which are reproduced by using a set of the first data format is called a speech element. The second data format of FIG. 5(*b*) shows the silent duration in a speech, and has the flag (0). The third data format of FIG. 5(*c*) shows the control data for the stopping the speech. Those data formats are stored in a memory 101 (FIG. 4C) as shown in FIG. 6, and the content of the memory is read out by an external controller. The third data format is provided at the end of each speech.

In FIG. 5(*a*), and FIG. 5(*b*), the flag (a) is provided in order to indicate if the data format is the first one (FIG. 5(*a*)), or the second or the third one (FIGS. 5(*b*), 5(*c*)). The area (b) in FIG. 5(*a*) stores the value of length of speech segment of the symmetrical waveform, and is composed of 7 bits. The area (c) of FIG. 5(*a*) stores the pointer increment/decrement value with the initial value of the pointer in every repetition and is composed of 3 bits. The area (d) of FIG. 5(*a*) stores the initial value setting pointer value for providing the initial value to the register 173, and is composed of 5 bits. The area (e) of FIG. 5(*a*) stores the pointer initial value for providing the initial value of the pointer 165 (FIG. 4) and is composed of 4 bits. The area (f) of FIG. 5(*a*) stores the number of repetition times and has 4 bits. The areas $g_1$ through $g_6$ in FIG. 5(*a*) store an ADPCM data, each of which has 4 bits, for the reproduction of a voice signal. The number of the ADPCM data stored in the memory is half of the number of data of the speech segment, thus, when the speech segment has the length 7, the number of ADPCM data is 3, and when the speech segment has the length 8, the number of ADPCM data is 4. Those ADPCM data are read out repetitively.

The flag in the second data format in FIG. 5(*b*) discriminates the first and the second data format. The flag is '0' for the second data format. The silent length is the data for providing the silent duration. When the value of the silent length is '1', the silent length is 128 speech output time length, and when that value is '2', the silent length is 256 speech output time length. When the value is '0', the data format coicides with that of FIG. 3(*c*) and it means the stopping of the speech output.

Figure 4:
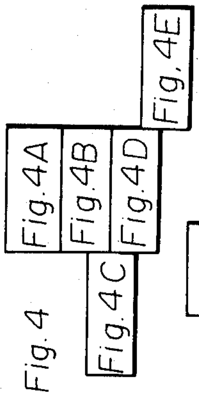
Figure 4A:
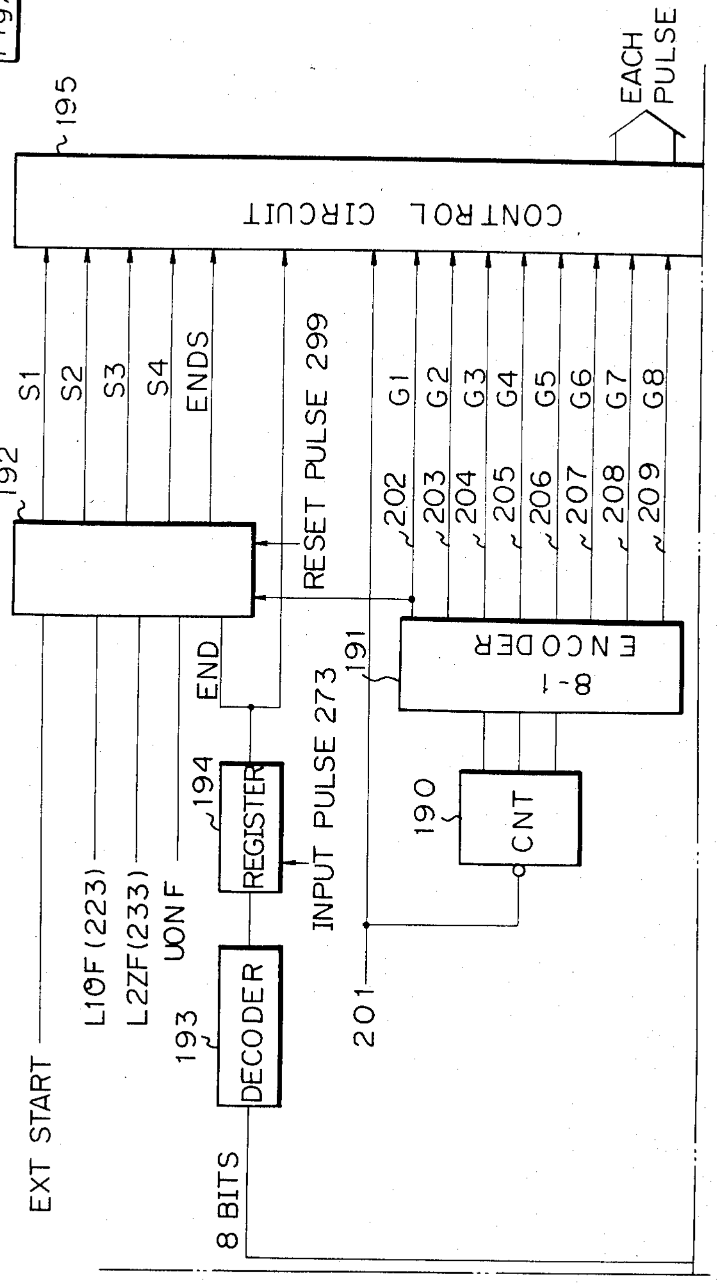
Figure 4B:
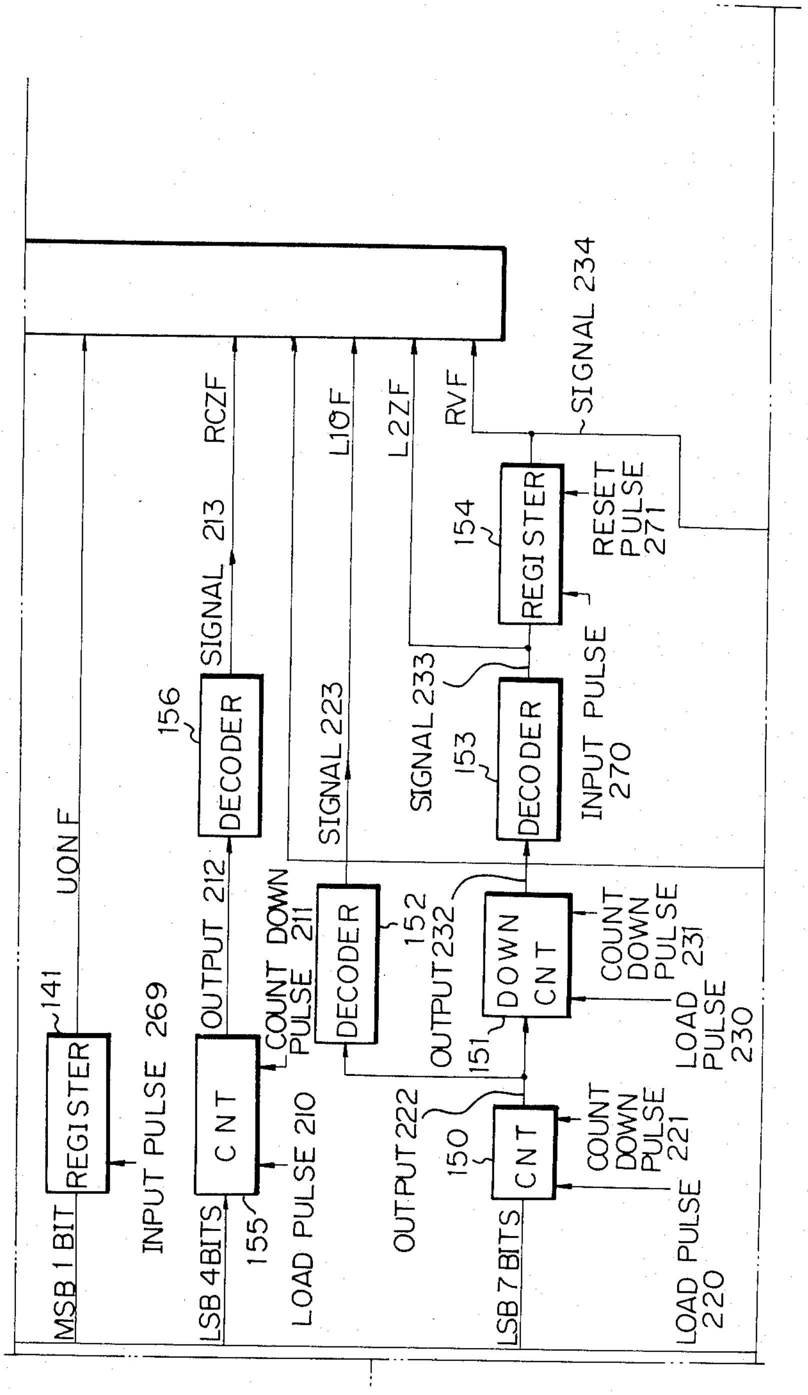
Figure 7A:
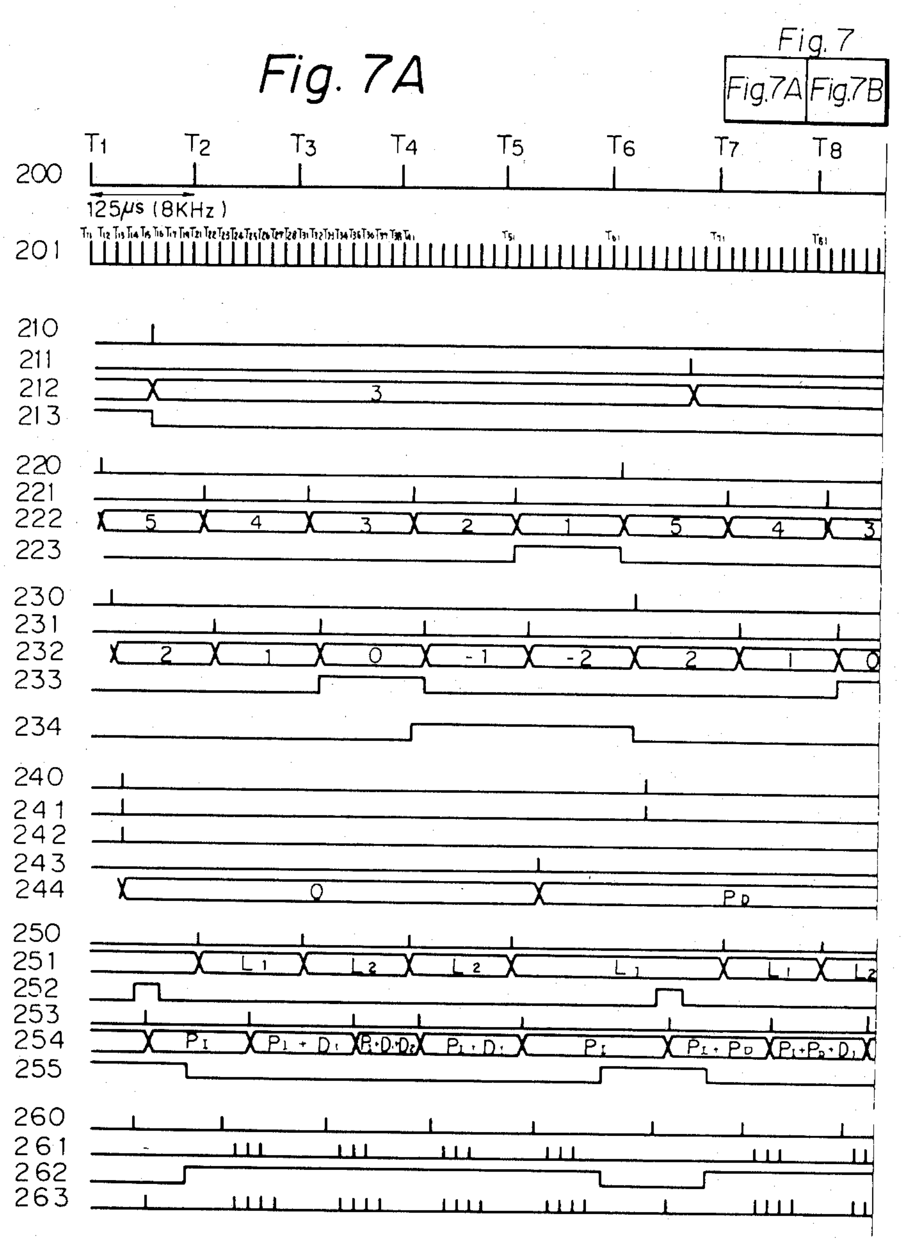
Figure 7B:
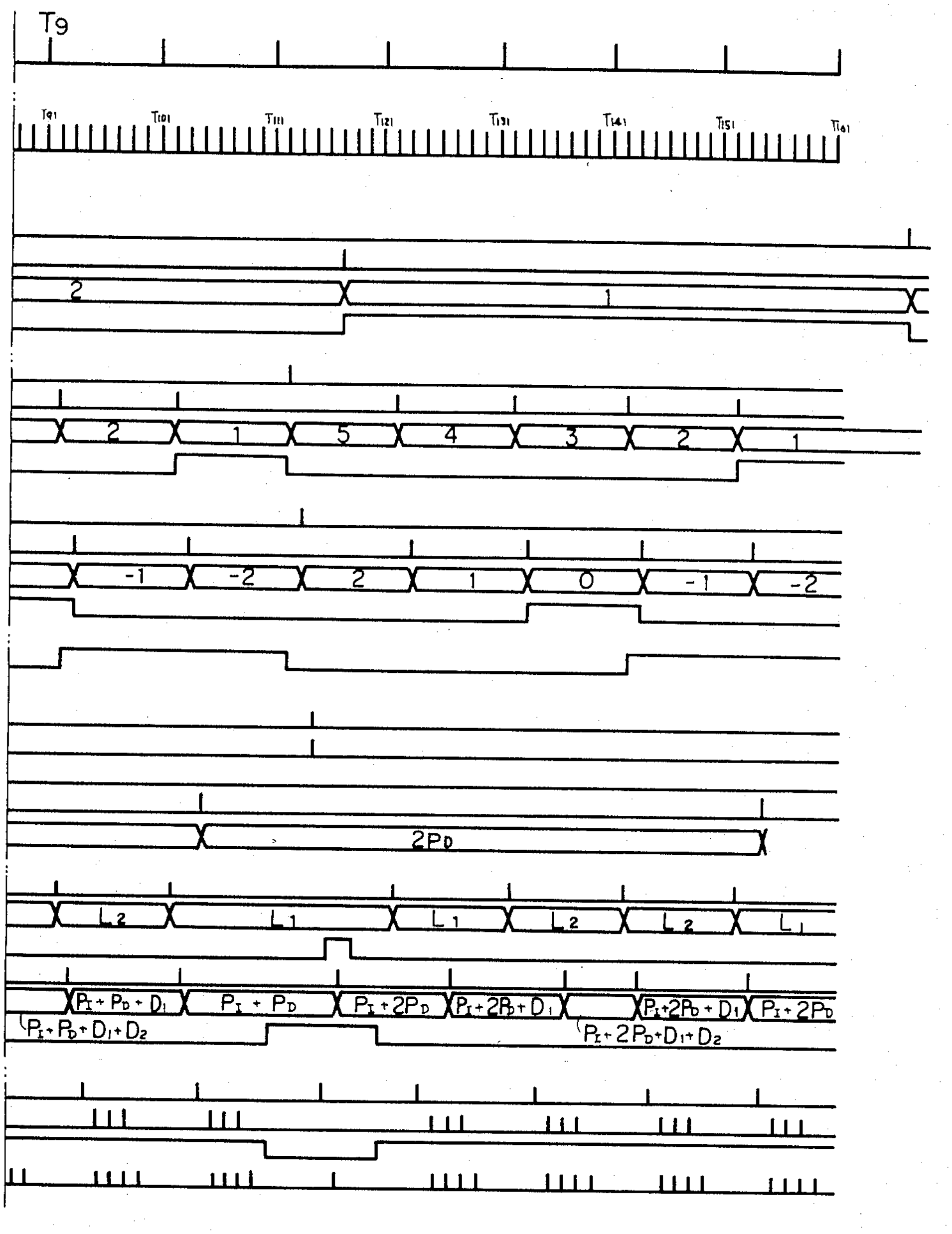
Figure 8A:
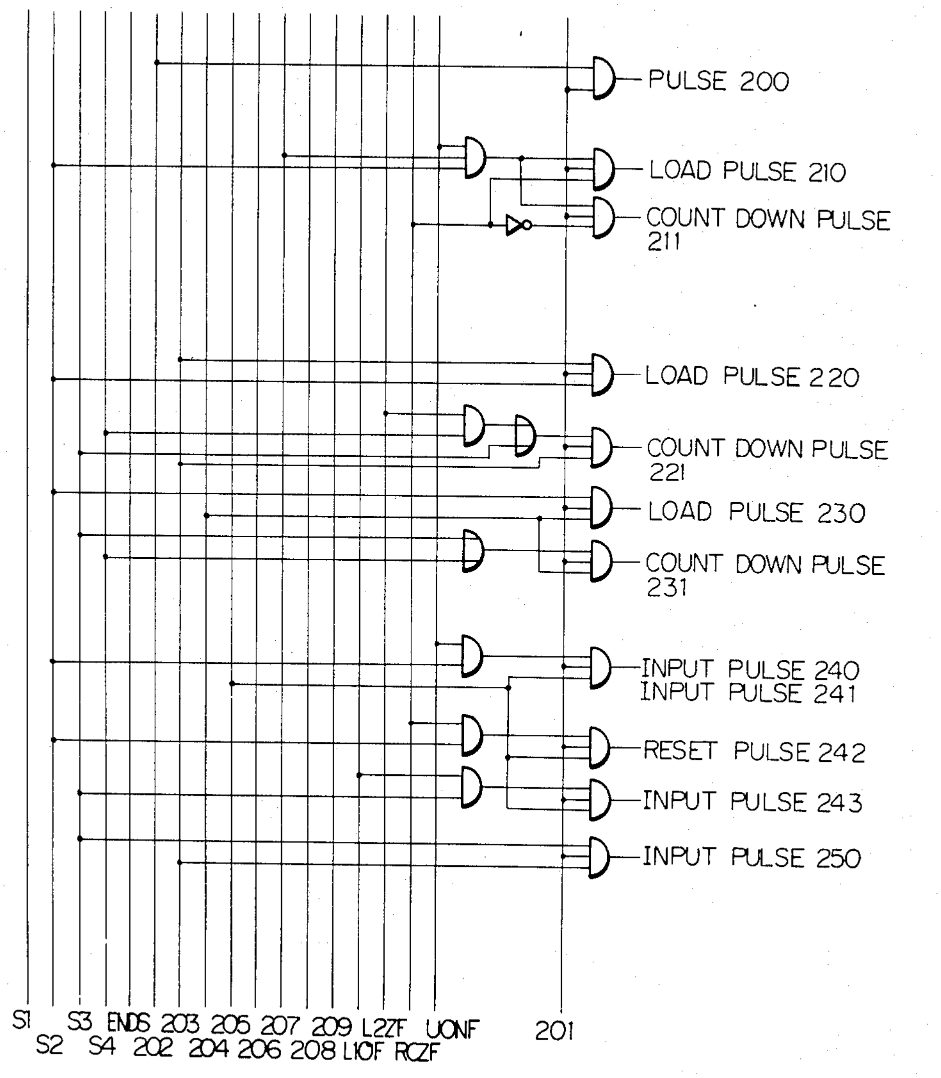
FIGS. 8(*a*), 8(*b*), 8(*c*) and 8(*d*) are circuit diagrams of the control circuit 195 in FIG. 4.
Figure 8B:
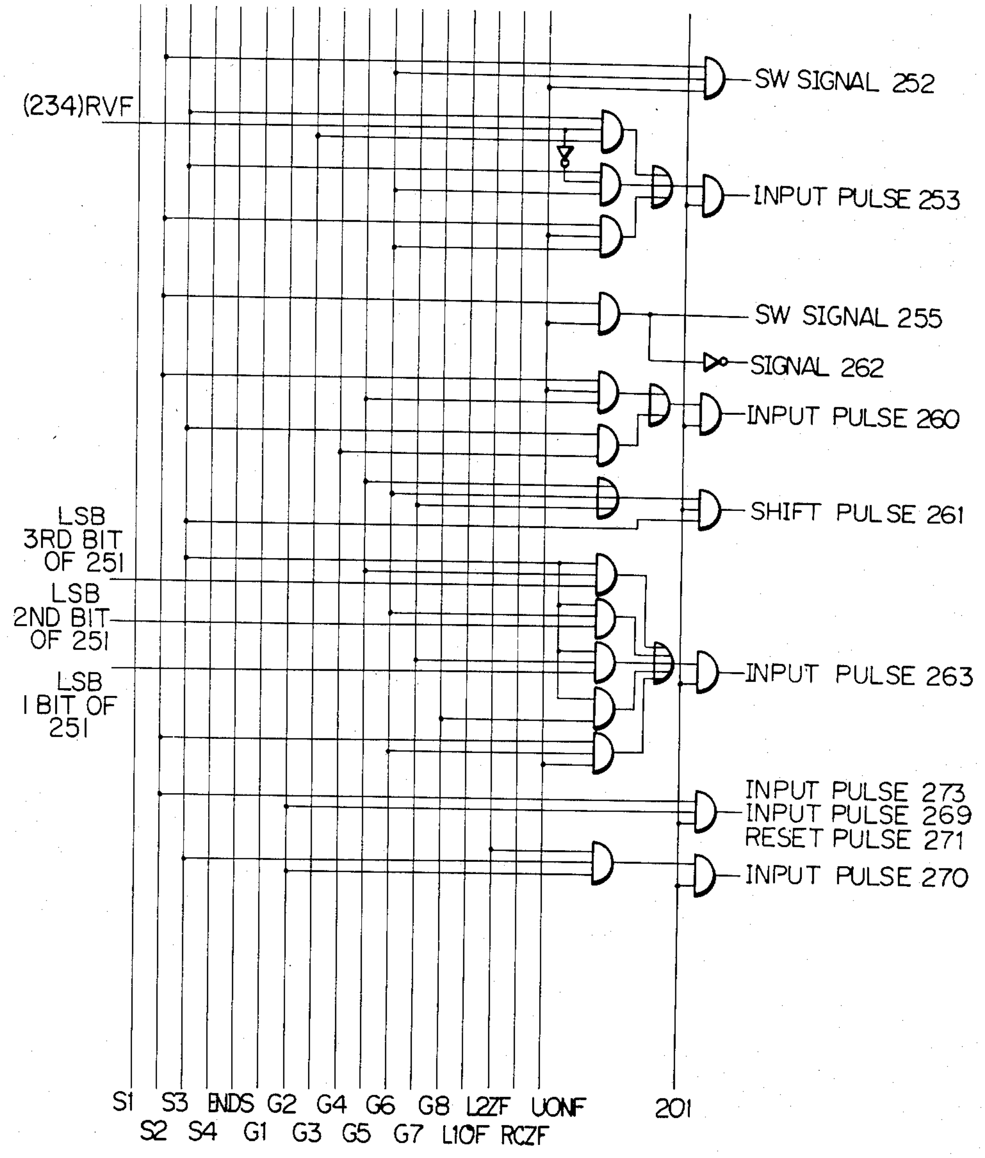
Figure 8C:
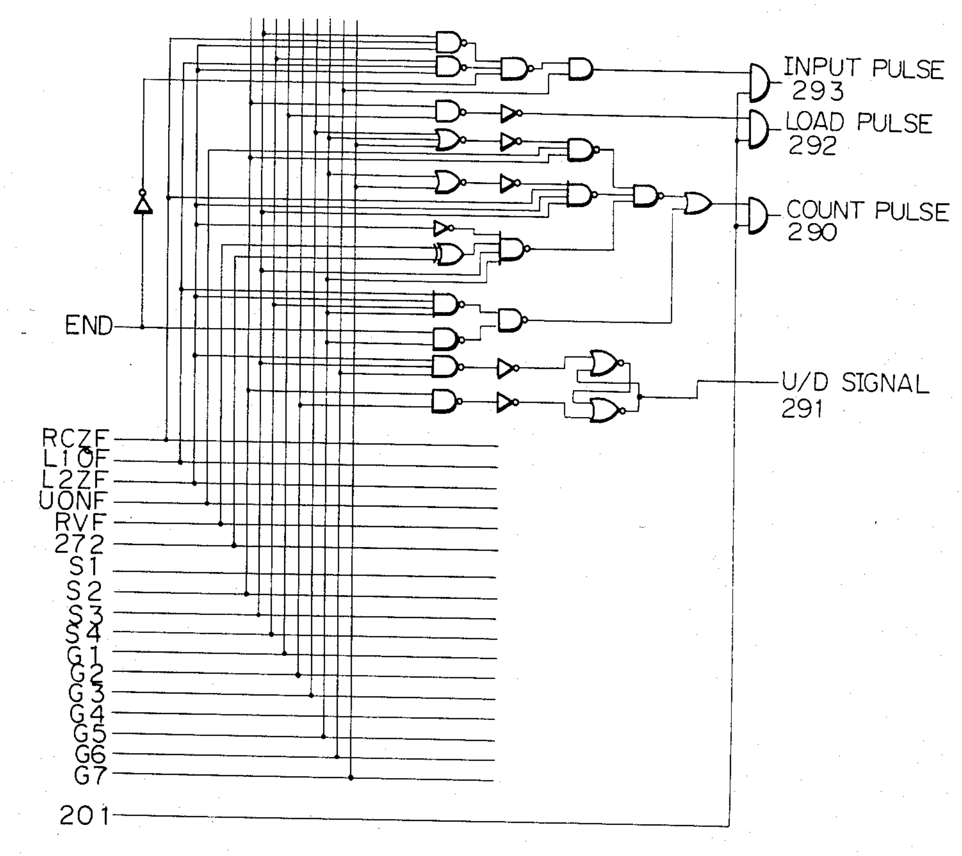
Figure 8D:
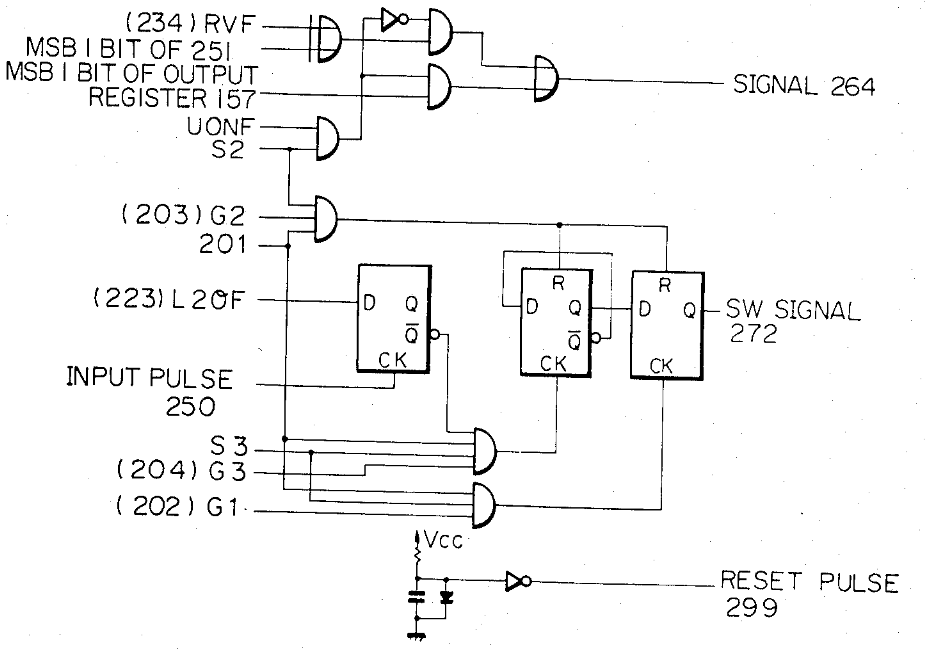

FIG. 4 is a block diagram of the speech synthesizer according to the present invention, and, FIG. 7 shows the operational time chart of the control signals in FIG. 4.

In FIG. 4, the reference numeral 100 is an up/down counter for providing address to a speech data memory, and has the number of bits defined by the capacity of the speech data memory. The counter 100 is incremented by the count pulse 290 when the U/D signal 291 is '1', and is derecremented by said count pulse 290 when the U/D signal 291 is '0'. Also, when the load pulse 292 is accepted, the content of the register 102 is accepted.

The numeral 101 is a speech data memory, the address of which is determined by said counter 100, and said memory 101 provides the 8 bits of parallel outputs. The content of the same is shown in FIG. 5 and FIG. 6.

The numeral 102 is a register which accepts the output of said counter 100 by the input pulse 293, and is called a next address register, since it stores the address of the data to be executed when a data format in FIG. 5 is finished.

The numeral 103 is a 8-bits register for storing the 8-bits output of the speech data memory by the input pulse 201.

The numeral 141 is a one-bit register for storing a flag which shows a speech data format. That flag is input into the register 141 by the input pulse 269 from the MSB (most significant bit) side of the output of the register 103, and the output of the register 141 is referred to as UONF.

The numeral 150 is a 7-bits counter which stores the 7-bits data from the LSB (least significant bit) side of the register 103 as the speech segment length, and is decremented by the count down pulse 221, and provides the output 222.

The numeral 151 is a 6-bits counter for accepting half value of the content of the counter 150 (speech segment length), is decremented by the count down pulse 231, and provides the output 223.

The numeral 152 is a decoder which provides the control signal LIOF (signal 223) when the output 222 of the counter 150 is '1'.

The numeral 153 is a decoder which provides the control signal L2ZF (signal 233) when the output 232 of the counter 151 is '0'.

The numeral 154 is a J-K flip-flop type register, which is reset to Zero by the reset pulse 271. The output of the register 154 is reversed by the input pulse 270 if the output (R2ZF) of the decoder 153 is '1', and that output is not reversed if the output of the decoder 153 is '0'. The output of the register 154 is the control signal RVF (signal 234).

The numeral 155 is a 4-bits counter which receives the repetition times from the 4 bits data of the LSB side of the output of the register 103 by the load pulse 210, is decremented by the count down pulse 211, and provides the output pulse 212.

The numeral 156 is a decoder which provides the output '1' as the control signal RCZF (signal 213) when the output 212 of the counter 155 is '0'.

The numeral 157 is a register which receives the initial value setting pointer value from the 5 bits of the LSB side of the output of the register 103.

The numeral 158 is the register which receives the pointer increment/decrement value of the 3 bits from the MSB side of the register 103 by the input pulse 241.

The numeral 159 is a register which is initially reset to zero by the reset pulse 242, and is added with the content of the register 158 by the input pulse 243 for every repetition process, and provides the output 244.

The numeral 160 is an adder for providing the sum of the output of the register 159 and the register 158.

The numeral 161 is an adder for providing the sum of the outputs of the registers 159 and 157.

The numeral 162 is a 4-bits register which stores the ADPCM data through the switch 178 by the input pulse 250, and provides the output signal 251.

The numeral 163 is a moving ROM (read only memory) which provides the moving quantity of the pointer by the ADPCM data (the output 251 of the register 162).

The numeral 164 is an adder/subtractor for the moving control of the pointer 165, and functions as an adder when the control signal RVF (signal 234) is '0', and functions as a subtractor when the control signal RVF (signal 234) is '1'.

The numeral 165 is a pointer which stores the signal selected by the switch 166 by the input pulse 253, and provides the output.

The numeral 166 is a switch which is switched by the signal 252. The switch 166 provides the output of the adder/subtractor 164 when the signal 252 is '0', and provides the 4 bits of MSB side of the register 103 when the signal 252 is '1'.

The numeral 167 is an adder for the sum of the pointer 165 and the register 159, and provides the output 254.

The numeral 168 is a switch which is switched by the signal 255. The switch 168 provides the output of the adder 167 when the SW signal 255 is '0', and provides the output of the adder 161 when the SW signal 255 is '1'.

The numeral 169 is a limiter for restricting the level of the output of the switch 168 in the range between 0 and 63.

The numeral 170 is a ROM which stores the quantization step size, and provides the 16-bits output data according to the address data from the limiter 169.

The numeral 171 is a 16-bits register which accepts the output of the ROM 170 by the input pulse 260, and shifts one bit down the content by the shift pulse 261 so that the value of the content of the same is halved.

The numeral 172 is an adder/subtractor for the ADPCM reproduction calculation. The device 172 functions as an adder when the control signal 264 is '0', and functions as a subtractor when the control signal 264 is '1'.

The numeral 173 is a register for storing the output of the adder/subtractor 172 by the input pulse 263.

The numeral 174 is an AND circuit which provides zero to one of the inputs of the adder/subtractor 172 so that the output of the register 171 is directly applied to the register 173 when the control signal 262 is '0'.

The numeral 175 is a limiter for restricting the level of the output of the register 173 to the predetermined range.

The numeral 176 is a register for storing the output of the limiter 175 by the input pulse 200.

The numeral 177 is a digital-analog converter for converting the digital signal of the output of the register 175 to an analog form.

The numeral 178 is a switch for switching the output of the register 103. When the switching signal 272 is '0', the 4-bits in the MSB side of the register 103 are taken, and when the signal 272 is '1', the 4-bits in the LSB side of the register 103 are taken.

The numeral 190 is a counter which is incremented by the fall down edge of the control pulse 201.

The numeral 191 is an encoder for providing 8 lines of encoded outputs 202–209 by the 3 bits output of the counter 190.

The numeral 192 is a status set circuit for setting the status of the present speech synthesizer. The circuit 192 is initially reset to zero by the reset pulse 299, and updates the status by the input pulse 202. The circuit 192 provides 5 status outputs S1, S2, S3, S4 and END.

The numeral 193 is a decoder which provides the output '1' when the content of the register 103 is '0'. That decoder 193 is used to find the third data format which stops the speech output.

The numeral 194 is a register which accepts the output of the decoder 193 by the input pulse 273, and provides END output. That is to say, when the register 103 provides the speech stop signal, that register 194 provides the END signal.

The numeral 195 is a control circuit for providing control signals according to the basic signals 200–209. The detail of the circuit 195 is shown in FIGS. 8A through 8D.

Now, the basic pulses 200–209 for operating the present synthesizer are described.

The pulse 200 is used for the output of the synthesized speech, and has in the present embodiment the period of 125 μS.

The pulse 201 is the master pulse for the process, and has the period of in the present embodiment 125/8 μS.

Figure 9:
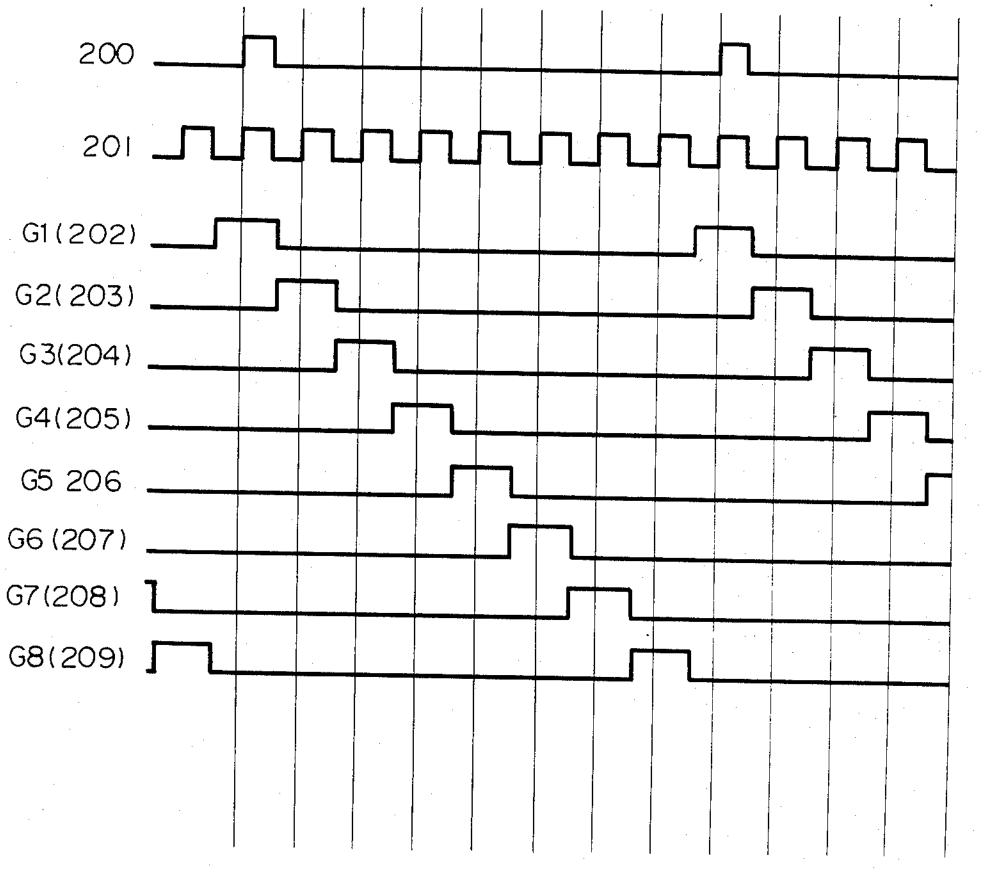
FIG. 9 shows the sequence of the control pulses 200 through 209.

The pulses 202–209 are outputs of the encoder 191 with the signal names G1 through G8, respectively. The sequence of the pulses 200 through 209 are shown in FIG. 9.

Next, the status of the present of the speech synthesizer is described.

As described before, the present apparatus has three data format as shown in FIG. 5, and has the preliminary process for interpreting a flag together with the speech synthesizer.

The present apparatus has five statuses, each of which is indicated by S1, S2, S3, S4 and ENDS signals.

The status S1='1' shows the beginning of the speech output.

Figure 4C:
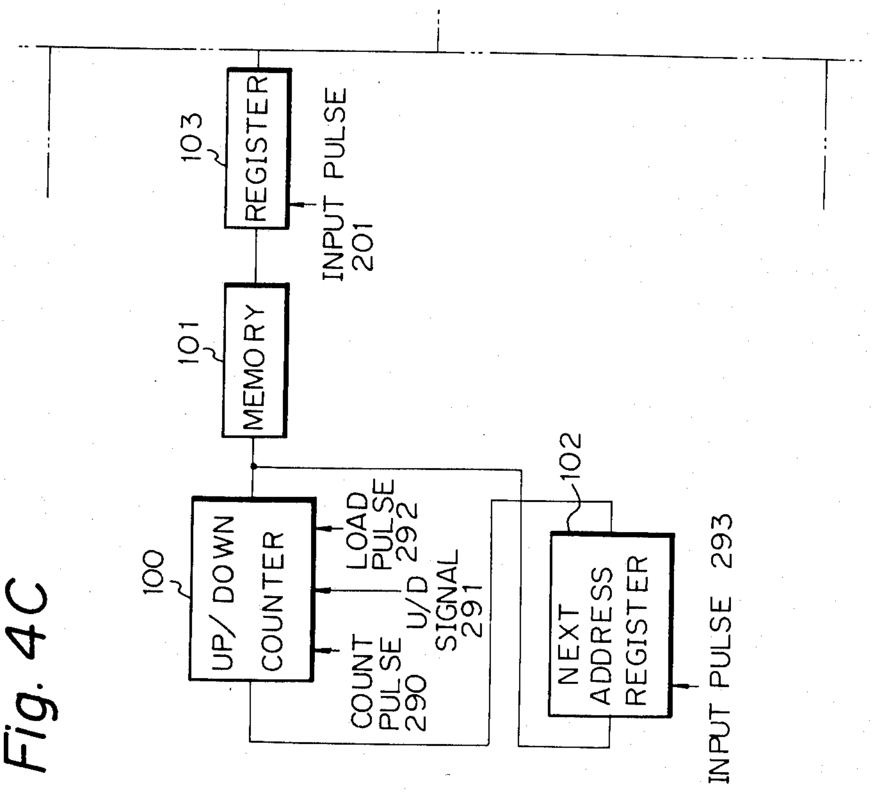
Figure 4D:
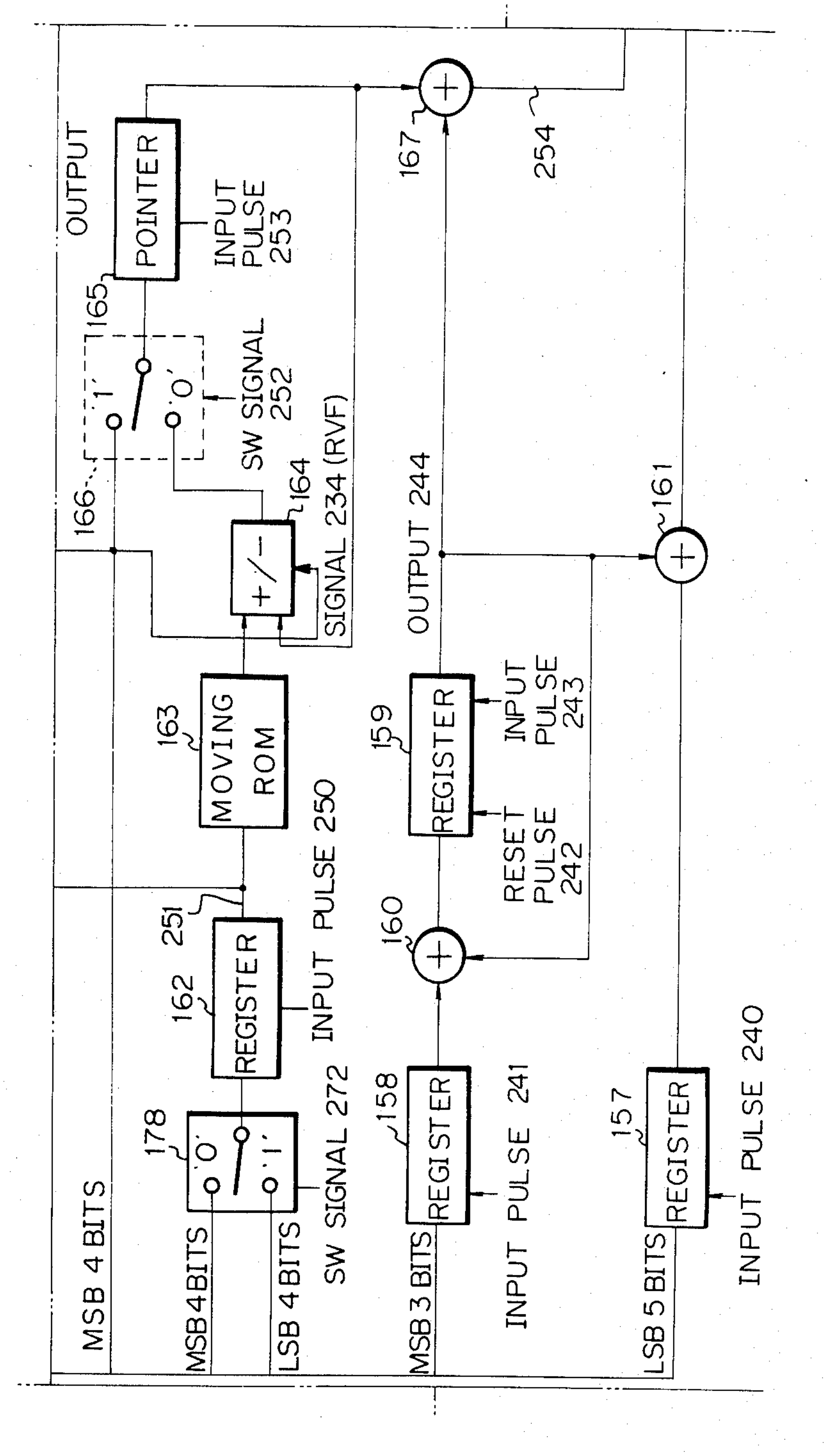
Figure 4E:
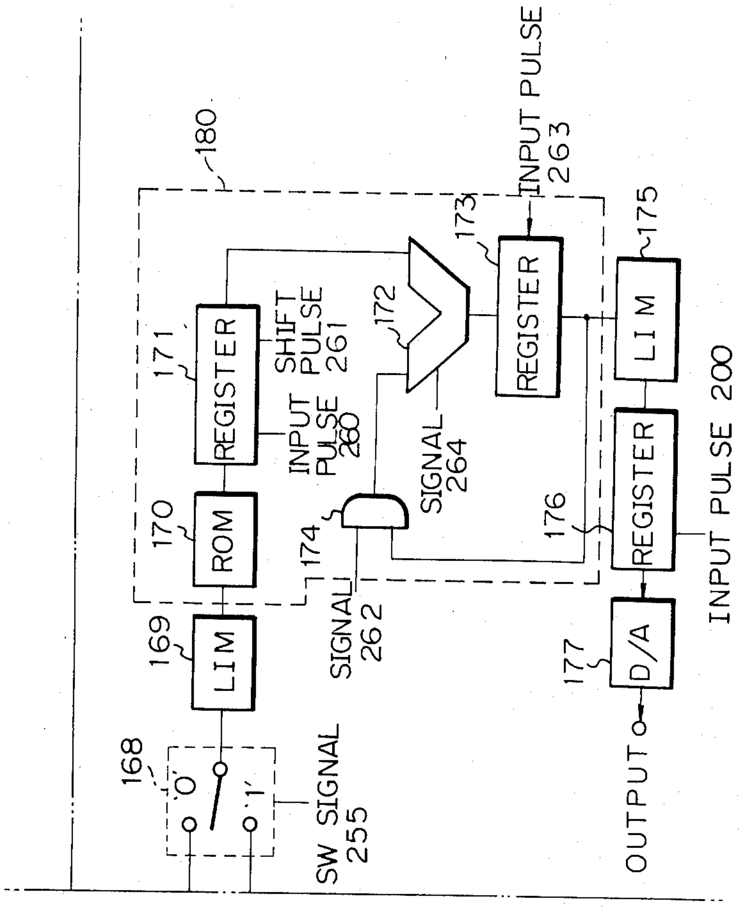

The status S2='1' shows the reading out of the "flag", "speech segment length", "pointer increment-/decrement value", "initial value setting pointer value", "pointer intial value", "repetition times", and "silent length" from the speech data memory 101 (FIG. 4C).

The status S3='1' shows the reproduction process of the symmetrical waveform using the ADPCM data.

The status S4='1' shows the silent process.

The status ENDS='1' shows the reading out of the third data format.

The new status signal is provided for every input pulse 202. When the power switch of the present apparatus is turned ON, all the status setting circuits 192 (FIG. 11) are initially zero.

The present apparatus is triggered by EXTSTART signal from an external circuit, and at that time, the status becomes S1='1'. Then, the speech synthesizing process is started and when the third data format which indicates the stop of the speech output is read out the END signal becomes '1', and the status ENDS becomes '1', thus, the speech output stops.

Figure 10:
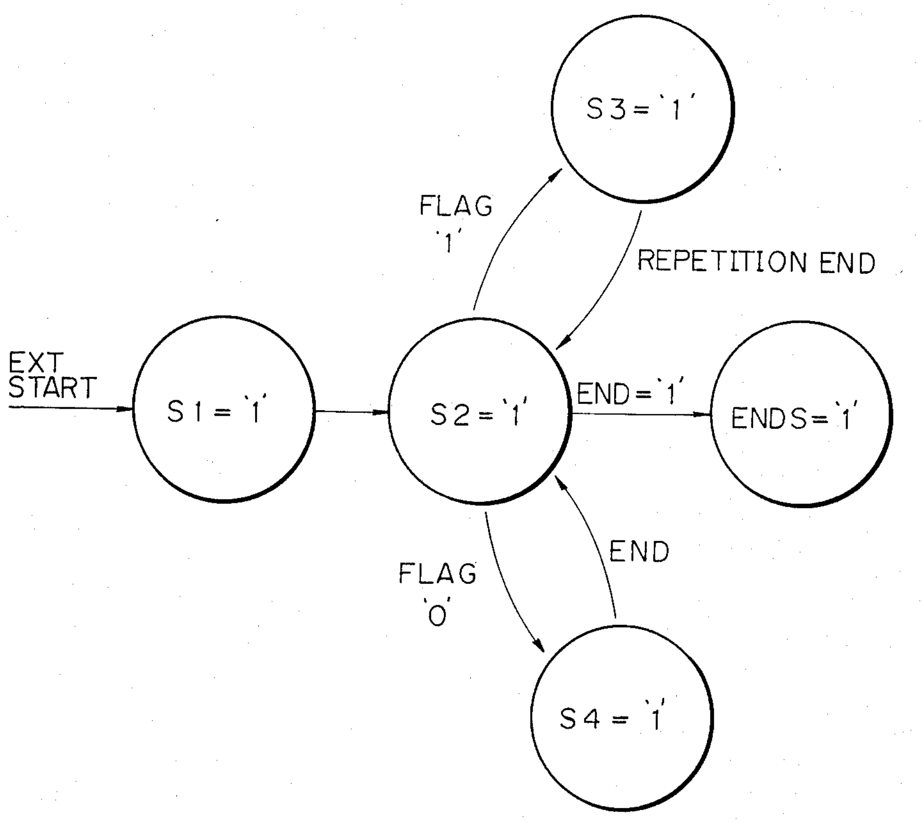
FIG. 10 shows the status transfer of the present speech synthesizer.

FIG. 10 shows the status transfer diagram.

Figure 11:
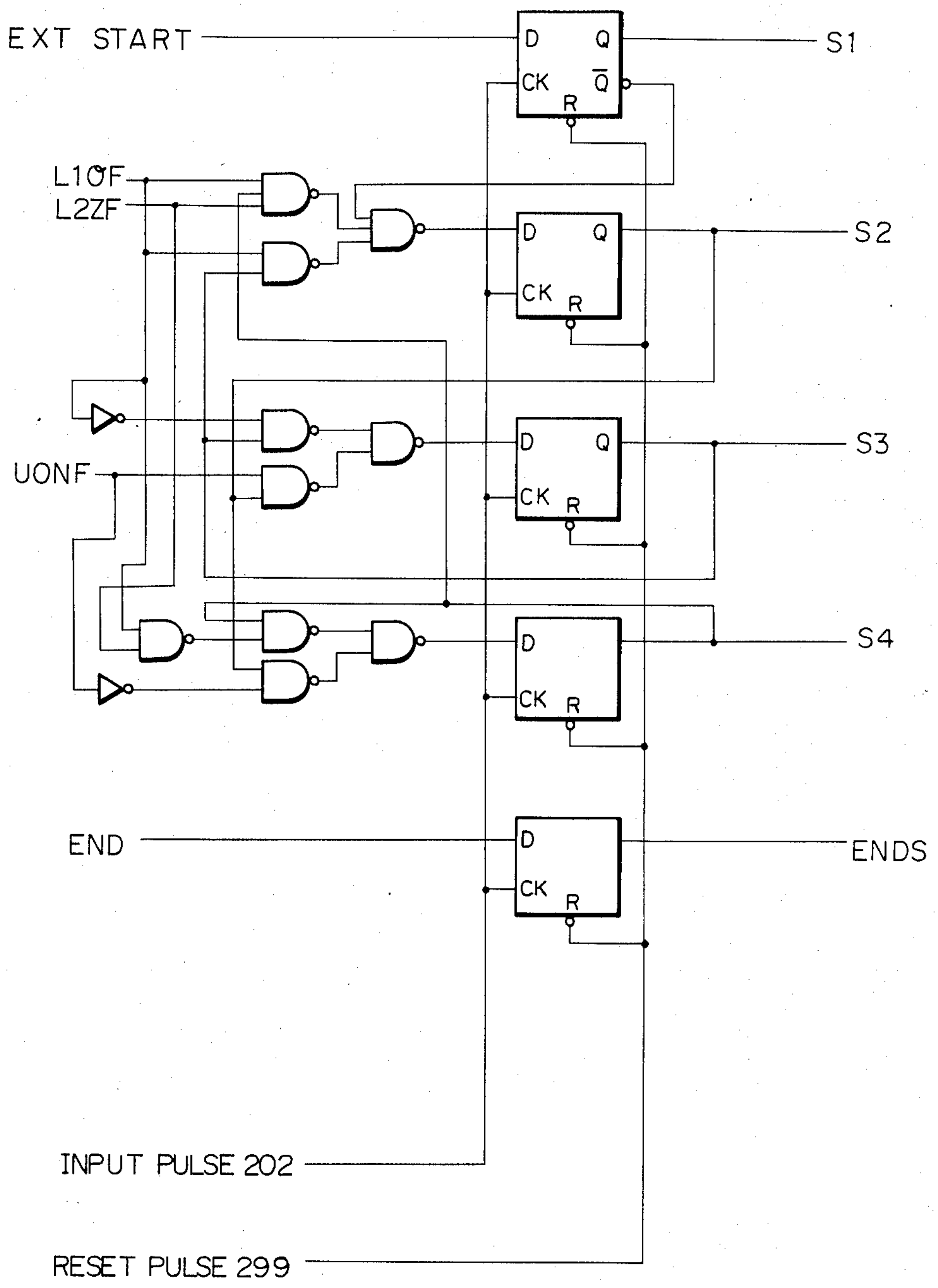
FIG. 11 is the circuit diagram of the status setting circuit 192 in FIG. 4.

The configuration of the status setting circuit 192 is shown in FIG. 11.

It is assumed in a data set that the speech segment length is 5, the pointer increment/decrement value is $P_D$, the initial set pointer value is $P_L$, the pointer initial value is $P_I$, the repetition times is 3. Further, it should be noted that the number of ADPCM data is 2 for the present speech segment length (=5), and those two ADPCM data are designated $L_1$ and $L_2$.

FIG. 7 showw the time sequence of the pulses in the apparatus of FIG. 4. In FIG. 7, the numeral 200 is a pulse for speech outtput applied to the register 176, and the period of that pulse is for instance 125 $\mu$S (=8 KHz), 201 is a process pulse which is 8 times as fast as the pulse 200, that is to say, 8 pulses $T_{11}$–$T_{18}$ of pulse 201 are inserted between two adjacent pulses ($T_1$–$T_2$) of the pulse 200. The numeral 210 in FIG. 7 is a control pulse for providing the output of the register 103 to the counter 155, 211 is a control pulse for the decrement of the counter 155, 212 is the output of the counter 155, 213 is the output (=RCZF) of the decoder 156, 220 a control pulse for inputting the output of the register 103 to the counter 150, 222 is the output of the counter 150, 223 is the output (=L1OF) of the decoder 152, 230 is a control pulse for inputting the data into the counter 151, 231 is a control pulse for decrement of the counter 151, 232 is the output of the counter 151, 233 is the output (=L2ZF) of the decoder 153, 234 is the output (=RVF) of the register 154, 240 is a control pulse for storing data in the register 157, 241 is a control pulse for storing data in the register 158, 242 is a control pulse for initiating the register 159, 243 is a control pulse for storing data in the register 159, 244 is the output of the register 159, 250 is a control pulse for storing data in the register 162, 251 is the content of the register 162, 252 is the control signal for switching the switch 166, 253 is a control signal for storing data in the pointer 165, 254 is the output of the adder 167, 255 is the swtiching control signal of the switch 168, 260 is a control pulse for storing data in the shift register 171, 261 is the shift control pulse of the shift register 171, 262 is the gate control signal $S_2$ of the AND circuit 174, and 263 is a control pulse for storing data in the register 173.

Next, the ROM 163 and the ROM 170 are described. The ROM 163 for the movement of a pointer receives the 4 bits of address data from the output (ADPCM data) of the register 162, and provides 4 bits of digital output. The embodiment of the content of the ROM 163 is shown in the table 1.

The ROM 170 stores the four times value of the quantization step size. The ROM has 6 bit addresses which are the outputs of the limiter 169 and the output of the ROM 170 are 16 bits. The capacity of the ROM 170 is 1024 bits. The content of the ROM 170 is shown in the table 2.

TABLE 1

| Address | Content | Address | Content |
|---|---|---|---|
| 0 | −1 | 8 | −1 |
| 1 | −1 | 9 | −1 |
| 2 | −1 | 10 | −1 |
| 3 | −1 | 11 | −1 |
| 4 | 2 | 12 | 2 |
| 5 | 4 | 13 | 4 |
| 6 | 6 | 14 | 6 |
| 7 | 8 | 15 | 8 |

TABLE 2

| Address | Content |
|---|---|
| 0 | $4 \cdot \Delta$ min |
| 1 | $4 \cdot \Delta$ min (1.1) |
| 2 | $4 \cdot \Delta$ min $(1.1)^2$ |
| 3 | $4 \cdot \Delta$ min $(1.1)^3$ |
| 4 | $4 \cdot \Delta$ min $(1.1)^4$ |
| 5 | $4 \cdot \Delta$ min $(1.1)^5$ |
| 6 | $4 \cdot \Delta$ min $(1.1)^6$ |
| 7 | $4 \cdot \Delta$ min $(1.1)^7$ |
| . | . |
| . | . |
| . | . |
| 60 | $4 \cdot \Delta$ min $(1.1)^{60}$ |
| 61 | $4 \cdot \Delta$ min $(1.1)^{61}$ |
| 62 | $4 \cdot \Delta$ min $(1.1)^{62}$ |
| 63 | $4 \cdot \Delta$ min $(1.1)^{63}$ |

TABLE 3

| ADPCM | Differential Reproduced Value $q_n$ |
|---|---|
| 0 = 000 | $+\left[\frac{x}{8}\right]$ |
| 1 = 001 | $+\left[\frac{x}{4}\right] + \left[\frac{x}{8}\right]$ |
| 2 = 010 | $+\left[\frac{x}{2}\right] \quad + \left[\frac{x}{8}\right]$ |
| 3 = 011 | $+\left[\frac{x}{2}\right] + \left[\frac{x}{4}\right] + \left[\frac{x}{8}\right]$ |
| 4 = 100 | $+x \quad + \left[\frac{x}{8}\right]$ |

TABLE 3-continued

| ADPCM | Differential Reproduced Value $q_n$ |
|---|---|
| 5 = 101 | $+x + \left[\frac{x}{4}\right] + \left[\frac{x}{8}\right]$ |
| 6 = 110 | $+x + \left[\frac{x}{2}\right] + \left[\frac{x}{8}\right]$ |
| 7 = 111 | $+x + \left[\frac{x}{2}\right] + \left[\frac{x}{4}\right] + \left[\frac{x}{8}\right]$ |
| −1 | $-\left[\frac{x}{8}\right]$ |
| −2 | $-\left[\frac{x}{4}\right] - \left[\frac{x}{8}\right]$ |
| −3 | $-\left[\frac{x}{2}\right] - \left[\frac{x}{8}\right]$ |
| −4 | $-\left[\frac{x}{2}\right] - \left[\frac{x}{4}\right] - \left[\frac{x}{8}\right]$ |
| −5 | $-x - \left[\frac{x}{8}\right]$ |
| −6 | $-x - \left[\frac{x}{4}\right] - \left[\frac{x}{8}\right]$ |
| −7 | $-x - \left[\frac{x}{2}\right] - \left[\frac{x}{8}\right]$ |
| −8 | $-x - \left[\frac{x}{2}\right] - \left[\frac{x}{4}\right] - \left[\frac{x}{8}\right]$ |

x is the output of ROM 170
[ ]is the Gaussian symbol

Figure 1:
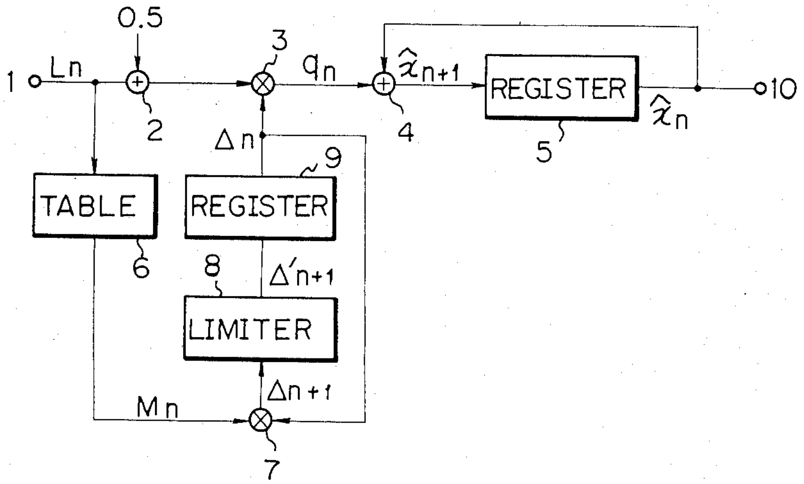
FIG. 1 is a block diagram of a prior ADPCM speech synthesizer.
Figure 2:
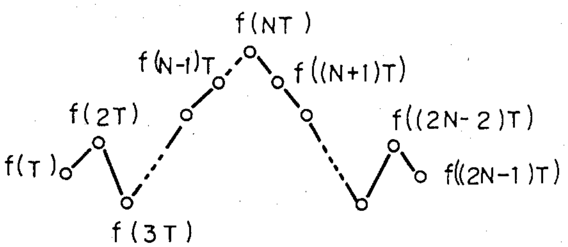
FIG. 2 shows example of symmetrical waveforms.

The ADPCM reproducer 180 calculates the differential reproduced value ($q_n$) by using the output of the ROM 170. The differential reproduced value ($q_n$) is calculated as shown in the table 3 by using the ADPCM data stored in the register 162 and the output (x) of the ROM 170. In the table 3, x/8 is always added (or subtracted), and according to the status (one or zero) of each binary figure of the ADPCM data, (x), (x/2), and (x/4) are added (or subtracted), or skipped as shown in the table 3. The differential reproduced value according to the present invention is similar to that of FIG. 1 and the previous equation (1).

Now, the operation of the present apparatus is described in accordance with the timing sequence of FIG. 7.

Process during $T_{11}$-$T_{18}$ (a) The initial value setting pointer value $P_L$ is set in the register 157, then, is applied to the ROM 170 through the adder 161 and the switch 168. The output of the ROM 170 is stored in the register 173 through the adder/subtractor 172. The value which is stored in the register 173 is provided by the table 2 as follows.

$$x_1 = 4\Delta\min(1.1)^{(PL)}$$

Said value in the register 173 is then stored in the register 176 by the control pulse $T_2$, then, is applied to the digital-analog converter 177.

(b) The pointer initial value $P_I$ is stored in the pointer 165 through the switch 166.

Process during $T_{21}$-$T_{28}$ (a) The first ADPCM data $L_1$ is stored in the register 162.

(b) The differential reproduced value for the ADPCM data $L_1$ is calculated according to the table 3. Since the address of the ROM 170 is $P_I$ at that time, the value (x) in the table 3 is;

$$4\Delta\min(1.1)^{(PI)}$$

It is assumed that the differential reproduced value at that time is $q_1$. The signal RVF at that time is "0" as shown in the control signal 234 in FIG. 7, the adder/subtractor 172 performs the addition. Accordingly, the content of the register 173 is;

$$x_2 = x_1 + q_1$$

Said value $x_2$ is stored in the register 176 by the control pulse $T_3$, and then, transmitted to an external circuit through the D/A converter 177.

(c) The output of the ROM 163 is obtained by the ADPCM data $L_1$, and when that output is $D_1$, the value $P_2$ of the pointer 165 is;

$$P_2 = P_I + D_1$$

Process during $T_{31}$-$T_{38}$ (a) The second ADPCM data $L_2$ is stored in the register 162.

(b) The ADPCM process is performed according to the table 3 for the second ADPCM data $L_2$. Since the address of the ROM 170 at that time is $P_I + D_1$, the value (x) in the table 3 is;

$$4\Delta\min(1.1)^{(PI+D1)}$$

It is assumed that the differential reproduced value is $q_2$, then, the context $x_3$ of the register 173 is;

$$x_3 = x_2 + q_2$$

That value $x_2$ is stored in the register 176 by the control pulse $T_4$, then, transmitted to an external circuit through the D/A converter 177.

(c) The output $D_2$ of the ROM 163 is obtained by the ADPCM data $L_2$, and the value $P_3$ of the pointer 165 is;

$$P_3 = P_2 + D_2 = P_I + D_1 + D_2$$

Process during $T_{41}$-$T_{48}$ (a) The new ADPCM DATA $L_2$ is stored in the register 162.

(b) The output $D_2$ of the ROM 163 is obtained by the ADPCM data $L_2$, and the value $P_4$ of the pointer 165 is;

$$P_4 = P_3 - D_2 = P_I + D_1 + D_2 - D_2 = P_I + D_1$$

At that time, since the control signal RVF is "1", the adder/subtractor 164 operates as a subtractor.

(c) The differential reproduction process according to the table 3 is accomplished for the ADPCM data $L_2$.

Since the address of the ROM 170 at that time is $P_I+D_1$, the value (x) in the table 3 is;

$$4\Delta\min(1.1)^{(PI+D1)}$$

It is assumed that the differential reproduction value at that time is $q_3$. Comparing the value $q_3$ with the value $q_2$ which has been obtained for the ADPCM data $L_2$ during $T_{31}$-$T_{38}$, $q_3=q_2$ is satisfied since the same ADPCM data $L_2$ is used and the same address $P_I+D_1$ for the ROM 170 is used for both $q_3$ and $q_2$.

At that time, the control signal 234 (RVF) in FIG. 7 is "1", therefore, the adder/subtractor 172 operates as a subtractor.

Accordingly, the value $x_4$ in the register 173 is;

$$x_4=x_3-q_2=(x_2+q_2)-q_2=x_2$$

That value $x_2$ is stored in the register 176 by the $T_5$ pulse, and then, is transferred to an external circuit through the digital-analog converter 177.

Process during $T_{51}$-$T_{58}$ (a) The ADPCM data $L_1$ is stored in the register 162.

(b) The output $D_1$ of the ROM 163 is obtained by the ADPCM data $L_1$, and the value $P_5$ of the pointer 165 is;

$$P_5=P_4-D_1=(P_I+D_1)-D_1=P_I$$

(c) The differential reproduction process for the ADPCM data $L_1$ is performed according to the table 3. Since the address of the ROM 170 at that time is $P_I$, the value (x) in the table 3 is;

$$4\Delta\min(1.1)^{(PI)}$$

The differential reproduction value $q_4$ satisfies $q_4=q_1$, and the value $x_5$ in the register 173 is;

$$x_5=x_4-q_4=x_2-q_1=(x_1+q_1)-q_1=x_1$$

That value $x_5$ is stored in the register 176 by the control pulse $T_6$, then, it is transferred to an external circuit through the digital-analog converter 177.

As explained above, through the process during [$T_{11}$-$T_{58}$], the content of the register 173 is symmetrical, like $x_1$, $x_2$, $x_3$, $x_2$, $x_1$.

In the next step during $T_{61}$-$T_{108}$, the similar process is accomplished except the initial output $P_D$ of the register 159 since the control pulse 243 of FIG. 7 is applied to the register 159.

Process during $T_{61}$-$T_{68}$ (a) The initial value setting pointer value $P_L$ is stored in the register 157, and the adder 161 adds the output $P_D$ of the register 159 to the output of the register 157, and the sum is an address data for the ROM 170.

The value stored in the register 173 is given by the table 2 as follows.

$$x_6 = 4\ \Delta\min(1.1)^{(PL+PD)}$$
$$= 4\ \Delta\min(1.1)^{(PL)}(1.1)^{(PD)}$$
$$= x_1\ (1.1)^{(PD)}$$

That value $x_6$ is stored in the register 176, and is transferred to an external circuit through the digital-analog converter 177.

(b) The pointer initial value $P_I$ is stored in the pointer 165 through the switch 166.

Process during $T_{71}$-$T_{78}$ (a) The first ADPCM data $L_1$ is stored in the register 162.

(b) The differential reproduction process for the ADPCM data $L_1$ is accomplished according to the table 3. Since the address of the ROM 170 at that time is $P_I+P_D$, the value (x) in the table 3 is;

$$4\Delta\min(1.1)^{PI+PD}$$

The differential reproduction value at that time is $q_6$. Comparing the value $q_1$ with $q_6$, both values are obtained according to the table 3 using the ADPCM data $L_1$. However, the value $x_1$ for the calculation of $q_1$ is $4\Delta\min(1.1)^{PI}$, and the value $x_6$ for the calculation of $q_6$ is $4\Delta\min(1.1)^{PI+PD}$. Therefore, $x_6=x_1(1.1)^{PD}$, and $q_6=q_1(1.1)^{PD}$ are satisfied.

Accordingly, the value $x_7$ in the register 173 at that time is;

$$x_7=x_6+q_6=x_1(1.1)^{PD}+q_1(1.1)^{PD}=x_2(1.1)^{PD}$$

That value $x_7$ is stored in the register 176 by the control pulse $T_8$, and then, transferred to an external circuit through the digital-analog converter 177.

(c) The output $D_1$ of the ROM 163 is obtained by the ADPCM data $L_1$, and the value $P_7$ of the pointer 165 is $P_7=P_I+D_1$ Process during $T_{81}$-$T_{88}$ (a) The second ADPCM data $L_2$ is stored in the register 162.

(b) The differential reproduction process is accomplished for the ADPCM data $L_2$ according to the table 3. Since the address of the ROM 170 is $P_I+D_1+P_D$, the value (x) in the table 3 is $4\Delta\min(1.1)^{(PI+D1+PD)}$. The differential reproduction value $q_7$ at that time satisfies $q_7=q_2(1.1)^{PD}$ as is the case of $T_{71}$-$T_{78}$.

Accordingly, the value $x_8$ in the register 173 is;

$$x_8=x_7+q_7=x_2(1.1)^{PD}+q_2(1.1)^{PD}=x_3(1.1)^{PD}$$

That value $x_8$ is stored in the register 176 by the control pulse $T_9$, and is transferred to an external circuit through the digital-analog converter 177.

(c) The output $D_2$ of the ROM 163 is obtained by the ADPCM data $L_2$, and the value $P_8$ of the pointer 165 is $P_8=P_7+D_2=P_I+D_1+D_2$.

Process during $T_{91}$-$T_{98}$ (a) The ADPCM data $L_2$ is stored in the register 162.

(b) The output $D_2$ of the ROM 163 is obtained by the ADPCM data $L_2$, and the value $P_9$ of the pointer 165 is;

$$P_9=P_8-D_2=P_I+D_1+D_2-D_2=P_I+D_1$$

(c) The differential reproduction process for the ADPCM data $L_2$ is accomplished according to the table 3. Since the address of the ROM 170 at that time is $P_9+P_D=P_I+D_1+P_D$, the value (x) in the table 3 is $4\Delta\min(1.1)^{(PI+D1+PD)}$.

The differential reproduction value $q_8$ at that time satisfies the following relations as in the previous case of $q_3$ during $T_{41}$-$T_{48}$.

$$q_8=q_3(1.1)^{PD}$$

The value $x_9$ is the register 173 at that time is;

$$x_9 = x_8 - q_8 = x_3(1.1)^{PD} - q_3(1.1)^{PD}$$

-continued $$= x_3(1.1)^{PD} - q_2(1.1)^{PD}$$

$$= x_2(1.1)^{PD}$$

That value $x_9$ is stored in the register 176 by the control pulse, and then, is transferred to an external circuit through the digital-analog converter 177.

Process during $T_{101}$–$T_{108}$ (a) The ADPCM data $L_1$ is stored in the register 162.

(b) The output $D_1$ of the ROM 163 is obtained by the ADPCM data $L_1$, and the value $P_{10}$ of the pointer 165 is;

$$P_{10}=P_9-D_1=P_I+D_1-D_1=P_I$$

(c) The differential reproduction process for the ADPCM data $L_1$ is performed according to the table 3. The address of the ROM 170 at that time is $P_{10}+P_D=P_I+P_D$ which is the output of adder 167 and the value ($x_n$) in the table 2 is $4\Delta\min(1.1)^{(PI+PD)}$.

The differential reproduction value $q_9$ at that time satisfies the following relations as in the case of $q_4$ during $T_{51}$–$T_{58}$.

$$q_9=q_4(1.1)^{PD}$$

The value $x_{10}$ of the register 173 at that time is;

$$x_{10} = x_9 - q_9 = x_2(1.1)^{PD} - q_4(1.1)^{PD}$$

$$= x_2(1.1)^{PD} - q_1(1.1)^{PD}$$

$$= x_1(1.1)^{PD}$$

That value $x_{10}$ is stored in the register 176, and then, is transferred to an external circuit through the digital-analog converter 177.

As described above, it should be appreciated that the symmetrical waveforms $x_1(1.1)^{PD}$, $x_2(1.1)^{PD}$, $x_3(1.1)^{PD}$, $x_2(1.1)^{PD}$, $x_1(1.1)^{PD}$ are synthesized. And, it should be noted that those waveforms have the amplitude of $(1.1)^{(PD)}$ times of the previous symmetrical waveforms ($x_1$, $x_2$, $x_3$, $x_2$, $x_1$) during $T_{11}$–$T_{58}$. And of course, the latter waveforms are analogous to the former waveforms.

The similar reproduction process is also accomplished in the next duration [$T_{111}$–$T_{158}$], except that the output of the register 159 is $2P_D$, as the control pulse 243 of FIG. 7 is applied to the register 159.

In the duration [$T_{111}$–$T_{158}$], the reproduced waveforms are $x_1(1.1)^{2PD}$, $x_2(1.1)^{2PD}$, $x_3(1.1)^{2PD}$, $x_2(1.1)^{2PD}$, $x_1(1.1)^{2PD}$ times of the waveforms of $T_{11}$–$T_{58}$, and of course the former waveforms are analogous to the latter waveforms.

As described above, according to the present invention, (1) merely hafe number of ADPCM data for the speech segment length provide symmetrical waveforms of synthesized speech, (2) a plurality of analogous repetitive waveforms with the smooth continuous amplitude change and improve the synthesized speech quality as compared with those of constant amplitude, and (3) due to the use of said analogous waveforms, the number of data for the speech synthesize is considerably reduced.

Accordingly, a lesser amount of ADPCM data can provide excellent synthesized speech quality.

From the foregoing, it will now be apparent that a new and improved speech synthesizer has been devised. It should be understood of course that the embodiments disclosed are merely illustrative and are not intended to limit the scope of the invention. Reference should be made to the appended claims, therefore, rather than the specifications as indicating the scope of the invention.

What claimed is:

1. A speech synthesizer for reproducing speech comprising at least a speech element having repeated symmetrical waveforms by using at least a data set which includes ADPCM data corresponding to the first half of the symmetrical waveform, repetition times R for repeating similar waveforms, a pointer increment/decrement value $P_D$ for determining amplitude of the waveforms in each repetition cycle, an initial value setting pointer value $P_L$ and a pointer initial value $P_I$ comprising:

(a) a first memory (170) storing a predetermined plurality of quantization step sizes, (b) means (158–160) which provide initially zero and accumulated value of pointer increment/decrement value $P_D$ in each repetition cycle, (c) means (157, 161, 168) for providing read address to said first memory (170), which provides initial symmetrical data in each repetition cycle, said means providing as read address an initial set pointer value $P_L$ for output of initial data of the first symmetrical waveform, and said means providing as read address a sum of initial value set pointer $P_L$ and accumulated value of pointer increment-/decrement value $P_D$ for output of initial data of the succeeding symmetrical waveforms, (d) a second memory (163) for providing pointer moving value $D_n$ according to ADPCM data $L_n$ which is given as an address data in first half cycle, and said second memory providing pointer moving value $D_n$ by using said ADPCM data $L_n$ in opposition sequence in latter half cycle, (e) pointer value output means (164–168) for providing address data of said first memory (170) for providing data $X_n$ for succeeding data after said initial data of symmetrical waveform in each repetition cycle, said means providing for the first waveform, (e-1) a pointer initial value $P_I$ at initial time for providing symmetrical waveform, (e-2) an accumulated sum of output $D_n$ of second memory (163) during reproduction of former half of symmetrical waveform, (e-3) a value which is obtained by subtracting sequentially output $D_n$ of said second memory (163) from the last value of said accumulated sum during reproduction of the latter half of symmetrical waveform, and said means further providing for succeeding waveforms, (e-4) a sum of pointer initial value $P_I$ and accumulated pointer increment/decrement value which is output of means (158–160) at initial stage, (e-5) an accumulated sum of output $D_n$ of second memory (163) during the former half of the symmetrical waveform, and (e-6) the value of which is obtained by subtracting sequentially the output $D_n$ of said second memory (163) from the last value of said accumulated sum in the latter half of the symmetrical waveform, (f) ADPCM reproducing means (170–174) for providing synthesized digital speech by (f-1) providing the content of said first memory (170) in address designated by said means (157, 161, 168) as initial data in each repetition of the symmetrical waveform, (f-2) providing the accumulated sum of said initial data and differential reproduced value $q_n$ which is obtained by the calculation using output $X_n$ of said first memory (170) in an address designated by pointer output means (164–168) and ADPCM data $L_n$, and (g) a digital-to-analog converter (177) for converting synthesized digital speech issued from said ADPCM reproducing means (170–174) to an analog form to provide an output speech signal.

2. A speech synthesizer according to claim 1, wherein said first and second memories (170, 163) are Read-Only-Memory.

3. A speech synthesizer according to claim 1, wherein a plurality of said data set are used for reproducing speech.

* * * * *